April 21, 1942.                N. C. PRICE                2,280,128
                            FLOW CONTROL VALVE
                          Filed April 7, 1939            2 Sheets-Sheet 2
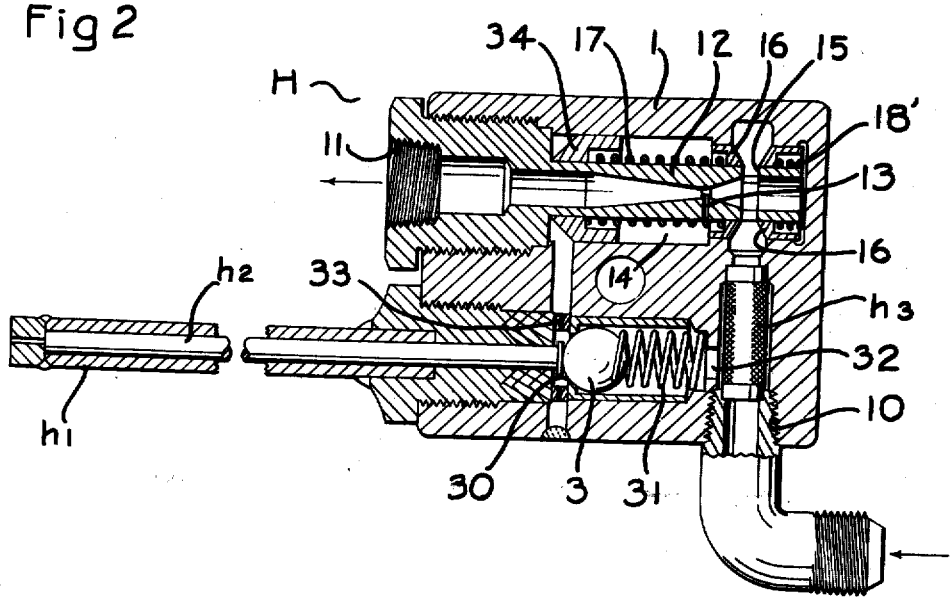
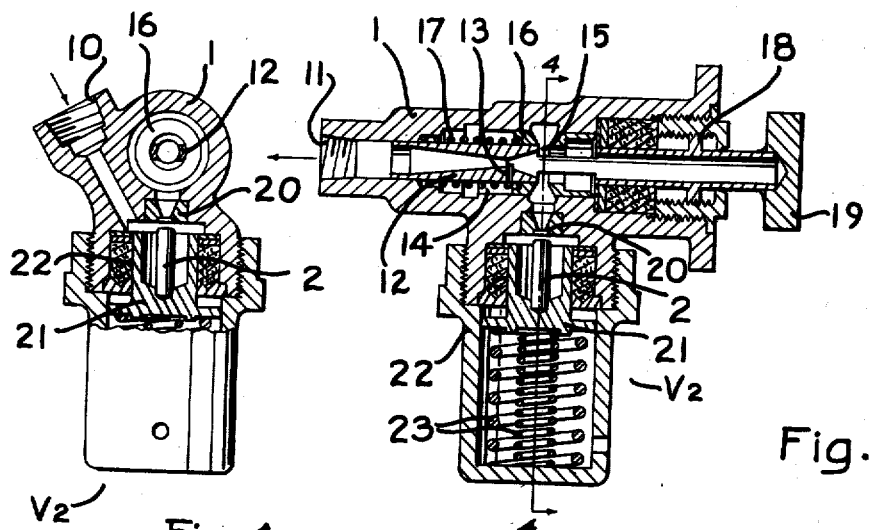
Inventor
Nathan C. Price
By Charles L. Reynolds
Attorney Patented Apr. 21, 1942

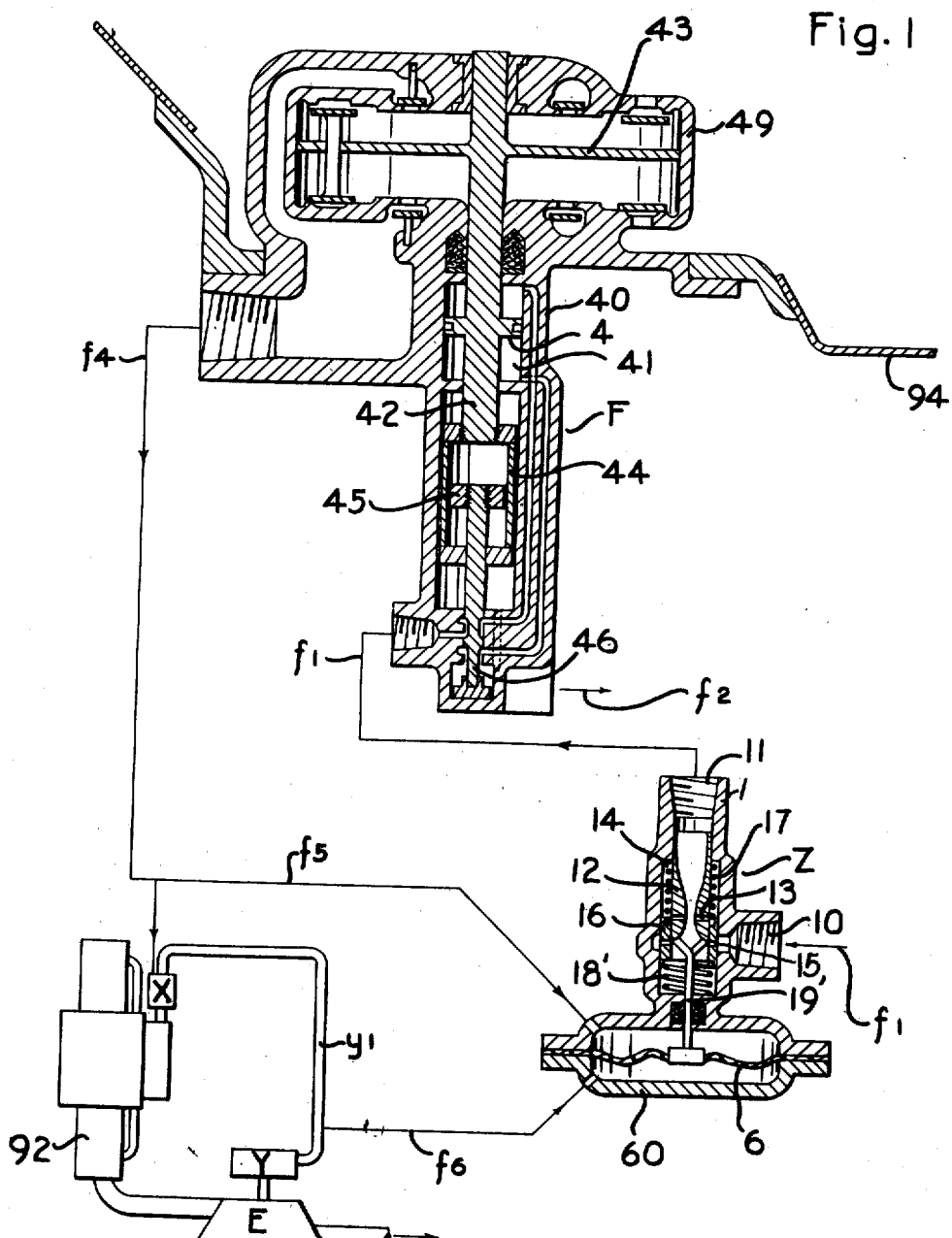

2,280,128

UNITED STATES PATENT OFFICE 2,280,128

FLOW CONTROL VALVE

Nathan C. Price, Hollywood, Calif., assignor, by mesne assignments, to Boeing Aircraft Company, Seattle, Wash., a corporation of Washington Application April 7, 1939, Serial No. 266,670

9 Claims. (Cl. 236—80)

The present invention relates to a hydraulic system or the like, wherein it is desired to maintain a constant rate of flow.

It is an object of the present invention to provide valve mechanism for incorporation in such a system, through which there is flow substantially at all times, which may be operated manually to select one of many rates which are to be maintained, or automatically to maintain the selected rate, and if automatically, then in accordance with any one of the various factors which tend to change the rate of flow, whether internally of the circuit or externally, whereby to compensate for such tendency to change the rate of flow, and thereby to maintain a constant rate of flow through the system.

With these and other objects in mind, as will appear hereafter, my invention comprises the novel valve or flow control for use in a typical system, such as is shown in the accompanying drawings, described in this specification, and as will be more particularly defined by the claims which terminate the same.

In the accompanying drawings I have shown my invention embodied in typical forms and in a typical hydraulic system, all as now preferred by me, and as representative of the uses to which this invention may be put, but not necessarily as illustrating the only practicable forms or arrangements.

Figure 1 is a diagram of a fuel supply system, such as is used upon airplanes, showing my invention incorporated in such a system in a simple, automatically controlled form.

Figure 2 is an axial section through a similar valve arranged, however, for control under the influence of a different factor, in this case temperature.

Figure 3 is a section similar to Figure 2 through a valve now arranged for manual operation, and illustrating also an automatic cut-off to interrupt fluid flow completely, and Figure 4 is, in substance, a section on the line 4—4 of Figure 3.

The fuel system, shown diagrammatically in Figure 1, is such a system as may incorporate the valve of my invention. As shown in this view, the fuel pump F is built into the bottom of a gasoline tank 94. My flow control unit is included within an automatic pressure regulator Z. The pump F delivers fuel to the carburetor X connected to an engine 92. The arrangement shown incorporates an exhaust gas turbine E operatively connected in an exhaust stack from the engine. A blower Y is driven by the exhaust turbine E and is connected for delivery of air under pressure to the carburetor X through a duct $y1$. In this particular system, no return line is needed for fuel pumped in excess of engine requirements, the automatic pressure regulator Z making this unnecessary. This automatic pressure regulator Z holds the rate of delivery of the pump F to a rate which is consonant with the rate of consumption of the carburetor X and of the air supply means or supercharger Y. Thus, the fuel system needs no return line, for there is no excess fuel pumped, and control is accomplished by regulation of the rate of operation of the fuel pump F, which in turn is secured through the constant rate-of-flow control which is the heart of this invention.

In the pump F, a piston 4 reciprocates within the cylinder 41, formed in the casing 40, and the stem 42 is reciprocated thereby. Reciprocable with the stem 42 is the diaphragm-like fuel piston 42, within its chamber 49, inside the fuel tank 94, and having direct inlet from the tank and discharge through the line $f4$. Likewise reciprocable with the stem 42 is a cage 44, the ends whereof are of magnetic material, and within this cage is a magnetically attractive element 45 which is connected to the pressure motor valve 46. This controls fluid entering the fuel pump motor through the lines $f1$, and such fluid, leaving the chamber 41 and passing the valve 46, is returned to a suitable reservoir (not shown) through the line $f2$. As the magnetic element at one end of the cage 44 approaches the magnetic element 45, the latter is attracted and moves with a snap action towards the approaching end of the cage 44, thereby reversing the valve 46 and starting the cage 44 and the piston 4 in the opposite direction, and this is repeated to accomplish reciprocation of the piston 4 and of the entrained piston 43. While the fuel pump has thus been explained in detail, it will be obvious that any suitable form and arrangement of a fuel pump may be employed.

The pumping rate of the fuel pump 43 is controlled by the rate of flow of the pressure fluid to the driving cylinder 41, and this in turn is controlled by the automatic regulator Z, which is responsive to pressure in this instance. This automatic pressure regulator is under the influence, on the one hand, of pressure of the fuel in the line $f4$ passing through the carburetor X, and communicated by a branch line $f5$ to one side of a flexible diaphragm 6 bisecting a chamber 60, and is movable on the other hand under the influence of air pressure communicated to the opposite side of the diaphragm 6 through a line f6, taken off the air conduit y1 which connects the supercharger Y with the carburetor X. Thus the rate of pumping of the fuel is a function in part of the fuel pressure and in part of the air pressure, both leading to the carburetor X. The pressure regulator, which will shortly be described in detail, includes an adjustable Venturi sleeve 12, the position of which is controlled by a stem 19' which is connected to and shiftable axially in accordance with deflection, in one direction or the other, of the flexible diaphragm 6.

The purpose of the automatic rate-of-flow control is to maintain a constant rate of flow regardless of changes of pressure, viscosity, and the like, in the fluid which drives the pump motor, and under the influence of such control factor in the pumped fluid as may be found necessary or desirable, whether that control factor be pressure, as shown in Figure 1, temperature, as indicated in Figure 2, or a manual control, as illustrated in Figure 3.

Thus in Figure 1, the pumping fluid, entering the casing of the control unit at 10, and leaving at 11, passes through the venturi of a slidable Venturi sleeve 12. The throat of the Venturi sleeve is ported, as indicated at 13, to afford communication between the low pressure throat and an annular chamber 14. The Venturi sleeve 12 and a surrounding sleeve 16, one of which is ported to the supply port 10, cooperate as the members of a sliding valve, designated as the valve 15. It is immaterial which sleeve is ported, or if both are ported, so long as one is, for it is the movement of one edge past the other which accomplishes the metering valve action. In Figure 1, the surrounding sleeve 16 is provided with an actual port, whereas the lower edge of the sleeve 12 cooperates with the latter as a metering valve.

By the interaction of these port edges in the sleeves 12 and 16, the cooperation of these sleeves 12 and 16 tends to close off the annular chamber 14 from the inlet 10, more or less. Also the rate of flow from the inlet 10 to the discharge port 11 is under control of the metering valve 15 formed between the cooperating sleeves 12 and 16. The sleeve 16 is shiftable downwardly, in Figure 1, under the influence of a compression spring 17, to increase the effective area of the valve 15, and is shiftable in the opposite direction to close down the effective area of the valve 15 under the influence of suction generated at the throat of the Venturi sleeve 12, acting through the port 13 and the chamber 14. A spring 18' opposes the spring 17, and effects or assists upward movement of the sleeve 16 under the influence of suction through the port 13.

Assuming a setting of the Venturi sleeve 12 and the cooperating sleeve 16, such that at normal flow the sleeve 16 is moved upwardly far enough that the valve 15 is partly, but not fully, opened, the normal rate of flow creates a given suction as it passes through the throat of the venturi, and reacts through the port 13 and chamber 14 upon the upper side of the ring 16, precisely counteracting the tendency of the spring 17 to move the ring 16 downwardly. This maintains the valve 15, governed by the relative positions of the sleeves 12 and 16, precisely in the relative partly opened position. However, if for any reason the rate of flow through the venturi of the sleeve 12 tends to decrease, the suction, acting through the port 13, likewise tends to decrease, thus permitting the ring 16 to move downwardly under the influence of spring 17, which attains the ascendency over the decreased suction acting upon the rear or upper side of the ring 16. This movement, though minute in extent, tends to increase the effective area of the valve 15, thereby speeding up the rate of flow through this valve and through the Venturi throat to compensate for any tendency to decrease the rate of flow.

Conversely, if the rate of flow through the Venturi throat tends to increase, it will increase the suction through the port 13 and will draw the ring 16 farther upwardly, thereby more greatly closing the valve 15, and tending to decrease the rate of flow through the throat of the venturi compensatingly. The port in the ring 16 and the lower edge of the Venturi sleeve 12 normally stand in an intermediate position, with the lower edge of the sleeve 12 somewhat below the upper margin of port, and, as has been stated, the amount of movement is extremely slight, whether under the influence of a tendency to increase or to decrease the rate of flow, with the result that very slight movement effects compensation of the position of the parts and tends to maintain accurately the regular and desired rate of flow through the hydraulic pumping system.

It will now be clear that the pumping rate can be regulated automatically in accordance with some condition in the pumping system, or in the system affected by or energized through the latter. For instance, in the fuel system of Figure 1, if the rate of consumption is lower than the rate of supply produced by the pumping system at the given pumping rate, pressure builds up and reacts through the diaphragm 6 to move the Venturi sleeve 12 upwardly, thereby more greatly opening the valve 15 and slowing down the pumping rate automatically. Thus if air pressure in the conduit y1 becomes too low, or the fuel pressure in the line f4 becomes too high, the Venturi sleeve 12 is automatically moved by the diaphragm 6 in a direction to slow down the rate of the pump 43, and if the air pressure in the conduit y1 becomes too high in proportion to the fuel pressure, or the fuel pressure in the line f4 becomes too low in relation to the air pressure in conduit y1, the Venturi sleeve 12 is moved automatically in a direction to decrease the pumping rate of the fuel. In this manner the pumping rate of the fuel is always held to that which is correct for the air supply through the conduit y1, so that there is always a correct mixture supplied at the carburetor X.

The arrangement shown in Figure 2 is quite similar to that described insofar as it controls the rate of flow. However, regulation of the rate of flow is accomplished automatically, in this instance, under the influence of temperature changes which affect the thermostat h1, h2. The tube h1 may be of duralumin, and is fixed to the casing H, and the inner end of the rod h2, which may be of invar, is positioned to engage a ball valve 3. This ball valve may be seated at 30 under the influence of a spring 31. The ball valve 3 is subjected to the influence of the fluid entering at the pressure port 10 through a port 32 in the casing 1, and when the valve 3 is unseated, pressure fluid, passing the valve through the bleed port 33, is afforded access to the rear or left side of a sleeve 34 which surrounds the Venturi sleeve 12 and is slidable therealong, which sleeve 34 constitutes the left anchorage or reaction base of the spring 17.

The valve 3 is unseated under the influence of cooling down of the thermostat h1, h2, and consequent effective movement of the inner end of the rod h2 to the right, pushing the valve 3 from its seat 30. Pressure fluid, passing the port 33, acts upon the sleeve 34 and tends to move the same to the right thereby increasing the force of the spring 17 and in turn tending to move the ring 16 to the right, in opposition to spring 18', increasing the effective area of the valve 15 and thereby increasing the rate of flow of fluid from the inlet port 10 to the discharged port 11. If the valve H is incorporated in the driving mechanism of a heating system, for example, in such fashion that increased rate of flow through the valve H produces an increased heating rate, the thermostat h1, h2 may be exposed to the temperatures thus induced, and increased heating will react through this thermostat to slow down the rate of flow of fluid through the valve H, thus maintaining an even and regular temperature.

In certain systems it may be desirable to provide means which are operable in case of emergency to prevent access of fluid to the system when the fluid is required for operation of some more essential system. Also it may be preferred in some systems to effect manual control of the rate of flow through the system.

To these ends, such a valve, as is shown in Figures 3 and 4, may be provided. In these views the operation of the rate-of-flow control is the same as that previously described save that the valve 15 is regulated manually by threading the sleeve 12 axially by the hand wheel 19 acting through the thread 18.

As a pressure operated cut-off device, a valve-like stem 2 is interposed between the pressure inlet 10 and the valve 15. This valve 2 may cooperate with a seat 20 to close off such communication, but normally the valve 2 is open. It is held in a plunger 21, slidable within a guide or cylinder 22, largely a packing material in the form shown, and is pressed upward by springs 23 tending to close the valve. However, the fluid pressure entering at 10 has full access to the upper side of the plunger 22 and so long as the fluid pressure at 10 is normal, it is sufficient to unseat the valve 2 and to hold the latter open. Should the pressure at 10 drop below normal, however, as would be the case where some more important system tending to draw off the fluid for use, then the pressure on the plunger 21 becomes insufficient to hold the valve 2 open against the action of the springs 23 which tend to close the valve. In consequence, the valve 2 closes, cutting off the supply of fluid to the system which is controlled by such valve 2, and reducing the area, by that of the end of the valve 2, upon which the pressure acts to open the valve. This insures that the cut-off valve will not be re-opened until proper pressure has been restored. Upon restoration of the main system pressure to normal, the valve 2 reopens automatically replacing its system in operation.

It is believed that it will now be obvious how the rate of flow of fluid in such a system may be governed so that it may be either kept at a constant rate automatically, or may be varied automatically in accordance with controlling conditions, or manually in accordance with the judgment of the operator.

What I claim as my invention is:

1. In combination with a valve casing having an inlet for pressure fluid and an outlet, a Venturi sleeve movable therein, interposed between the inlet and the outlet, a ring closely fitting within the casing, surrounding the sleeve and movable axially relative to and cooperating with the latter to constitute a port of variable size governing the admission of the fluid to and through the Venturi sleeve, and balanced means, including a port between the low-pressure throat of the Venturi sleeve and one side of the ring, governing movement of the ring and tending to maintain constant rate of flow through the Venturi sleeve for any setting of the latter.

2. In combination with a valve casing having an inlet for pressure fluid and an outlet, a Venturi sleeve movable therein, interposed between the inlet and the outlet, a ring closely fitting within the casing, surrounding the sleeve and movable axially relative to and cooperating with the latter to constitute a port of variable size governing the admission of the fluid to and through the Venturi sleeve, balanced means, including a port between the low-pressure throat of the Venturi sleeve and one side of the ring, governing movement of the ring and tending to maintain constant rate of flow through the Venturi sleeve for any setting of the latter, and means to shift the Venturi sleeve axially relative to the ring, thereby to vary the rate of flow.

3. In combination with a valve casing having an inlet for pressure fluid and an outlet, a Venturi sleeve movable therein, interposed between the inlet and the outlet, a ring closely fitting within the casing, surrounding the sleeve and movable axially relative to and cooperating with the latter to constitute a port of variable size governing the admission of the fluid to and through the Venturi sleeve, balanced means, including a port between the low-pressure throat of the Venturi sleeve and one side of the ring, governing movement of the ring and tending to maintain constant rate of flow through the Venturi sleeve for any setting of the latter, and means operable automatically in response to change in the rate of flow, to shift said Venturi sleeve, relative to its ring, to compensatingly vary the rate of flow therethrough and to restore the present rate of flow.

4. In combination with a valve casing having an inlet for pressure fluid supply and an outlet, a Venturi sleeve in the casing interposed between the inlet and outlet, whereby the fluid flows therethrough, the casing being spaced from one end of said sleeve to define a chamber, a ring closing such chamber and movable therein, and relative to the sleeve, to constitute a port of variable area governing rate of flow through the casing, the Venturi sleeve having a suction port from its throat to said chamber, tending to shift said ring to vary the port area, yieldable means opposing suction-induced movement of the ring, whereby to maintain substantially constant rate of flow through the Venturi sleeve for any given setting of the sleeve and ring, and means to shift the sleeve and ring relatively and axially, thereby to vary the port area, and to alter the rate of flow through the Venturi sleeve.

5. In combination with a valve casing having an inlet for pressure fluid supply and an outlet, a Venturi sleeve in the casing interposed between the inlet and outlet, whereby the fluid flows therethrough, the casing being spaced from one end of said sleeve to define a chamber, a ring closing such chamber and movable therein, and relative to the sleeve, to constitute a port of variable area governing rate of flow through the casing, the Venturi sleeve having a suction port from its throat to said chamber, tending to shift said ring to vary the port area, yieldable means opposing suction-induced movement of the ring, whereby to maintain substantially constant rate of flow through the Venturi sleeve for any given setting of the sleeve and ring, and means to shift the ring axially relative to the sleeve, thereby to vary the port area, and to alter the rate of flow through the Venturi sleeve.

6. In combination with a valve casing having an inlet for pressure fluid supply and an outlet, a Venturi sleeve in the casing interposed between the inlet and outlet, whereby the fluid flows therethrough, the casing being spaced from one end of said sleeve to define a chamber, a ring closing such chamber and movable therein, and relative to the sleeve, to constitute a port of variable area governing rate of flow through the casing, the Venturi sleeve having a suction port from its throat to said chamber, tending to shift said ring to vary the port area, yieldable means opposing suction-induced movement of the ring, whereby to maintain substantially constant rate of flow through the Venturi sleeve for any given setting of the sleeve and ring, and means operable automatically in response to change in conditions which are governed by rate of fluid flow through the Venturi sleeve, to effect relative axial shifting of the sleeve and ring, thereby to alter the rate of fluid flow compensatingly.

7. In combination with a valve casing having an inlet for pressure fluid supply and an outlet, a Venturi sleeve in the casing interposed between the inlet and outlet, whereby the fluid flows therethrough, the casing being formed with a chamber within one end of which the Venturi sleeve projects, spaced from the chamber's walls, a reaction ring and a port-forming ring spaced apart in said chamber, each closely fitting and slidable relative to the chamber's walls and the sleeve, the port-forming ring cooperating with an edge of the Venturi sleeve to constitute a port of variable area governing rate of flow through the casing, the Venturi sleeve having a suction port from its throat to said chamber, between the rings, tending to shift the port-forming ring to increase the port area, a spring interposed between the rings and acting, in opposition to suction, to decrease the port area, whereby in operation substantial equilibrium is maintained, and means to shift the reaction ring, thereby, through the spring, to alter the position of the port-forming ring, and to vary the rate of flow.

8. In combination with a valve casing having an inlet for pressure fluid supply and an outlet, a Venturi sleeve in the casing interposed between the inlet and outlet, whereby the fluid flows therethrough, the casing being formed with a chamber within one end of which the Venturi sleeve projects, spaced from the chamber's walls, a reaction ring and a port-forming ring spaced apart in said chamber, each closely fitting and slidable relative to the chamber's walls and the sleeve, the port-forming ring cooperating with an edge of the Venturi sleeve to constitute a port of variable area governing rate of flow through the casing, the Venturi sleeve having a suction port from its throat to said chamber, between the rings, tending to shift the port-forming ring to increase the port area, a spring interposed between the rings and acting, in opposition to suction, to decrease the port area, whereby in operation substantial equilibrium is maintained, said casing being formed with a fluid passage affording access of pressure fluid behind the reaction ring, a valve normally closing such passage, and means to open said valve, to shift the reaction ring, thereby, through the spring, to alter the position of the port-forming ring, and to vary the rate of flow.

9. The combination of claim 7, wherein the means to shift the reaction ring is sensitive to a temperature effect flowing from the movement of fluid, and is constructed and arranged to shift the reaction ring in a sense such as will decrease the rate of fluid flow, and thereby reduce the temperature, under the influence of an increased temperature.

NATHAN C. PRICE.